April 14, 1959
C. T. BREITENSTEIN
2,881,810
METERING PUMP FOR LIQUID GAS FUEL
Filed July 20, 1956
2 Sheets-Sheet 1
FIG. 1
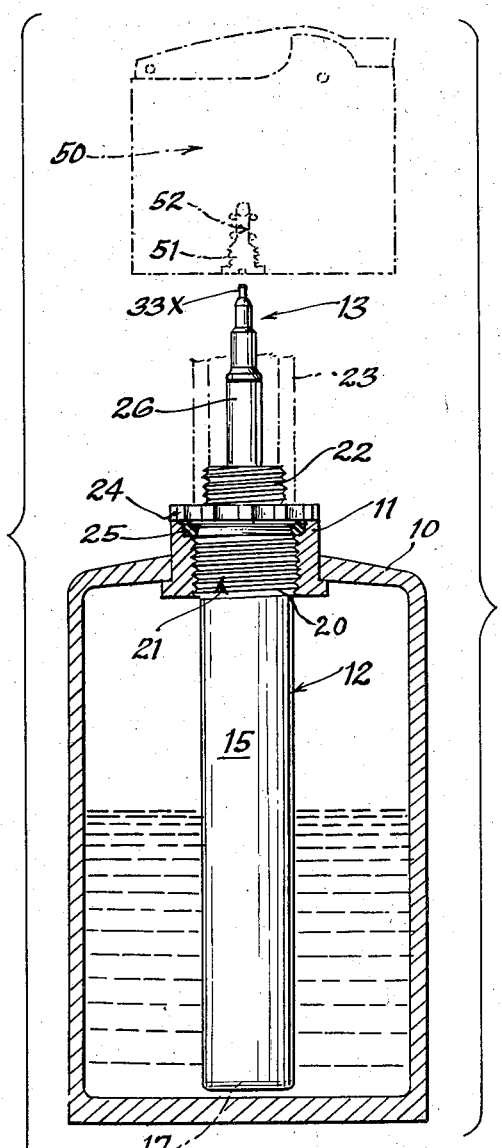
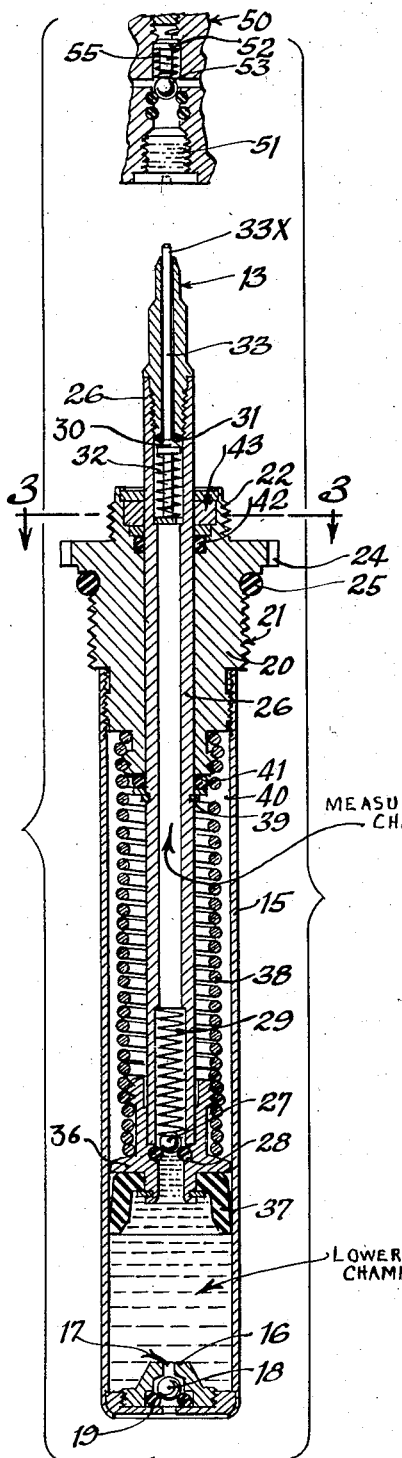
FIG. 2
INVENTOR.
Charles T. Breitenstein
BY
Attorney April 14, 1959 C. T. BREITENSTEIN 2,881,810
METERING PUMP FOR LIQUID GAS FUEL
Filed July 20, 1956 2 Sheets-Sheet 2

INVENTOR.
Charles T. Breitenstein
BY
Attorney

United States Patent Office 2,881,810
Patented Apr. 14, 1959

2,881,810

METERING PUMP FOR LIQUID GAS FUEL

Charles T. Breitenstein, Chicago, Ill., assignor to Raymond T. Moloney, Chicago, Ill.; American National Bank and Trust Company of Chicago, a national banking association, executor of the estate of said Raymond T. Moloney, deceased Application July 20, 1956, Serial No. 599,039

4 Claims. (Cl. 141—353)

The present disclosures relate to improvements in piston-type liquid metering pumps and charging devices, and provide a novel fueling canister with self-contained pump and metering-valve means for injecting a measured charge of pressurized liquified gaseous fuel into cigarette lighters and like devices.

Among the features of the fueling canister are a system of multiple valves serving to measure the fuel charge and also safely contain the liquified gas over long periods against slow leakage and possible accidents involving the fuel-injection nozzle means.

A further feature is the provision of a fuel injection device capable of working against a back pressure and having multiple valve means operable partly by pressure differentials and partly by externally applied forces for segregating a predetermined volume of liquid fuel and then discharging same through a movable injector rod containing additional valve means for passing such volume into the gas lighter as a function of the internal pressure of the measured volume and the act of pressing the lighter itself onto the injecting rod.

Still other features relate to the provision of an injection pump for safely and automatically metering out charges of liquified gaseous fuels under relatively high pressures, such as propane and butane, which are notoriously difficult to confine in small containers involving valves and the like, owing to the ability of such gases to escape from fine apertures and closing junctures.

More detailed objects and advantages characterizing the invention will appear as the following description proceeds in view of the annexed drawings, in which:

Fig. 1 is a cross section of the charging canister with the measuring pump shown in elevation;

Fig. 2 is a cross-sectional detail, to enlarged scale, through the measuring pump and a fragment of the charging port and valve in a gas lighter;

Figure 5:
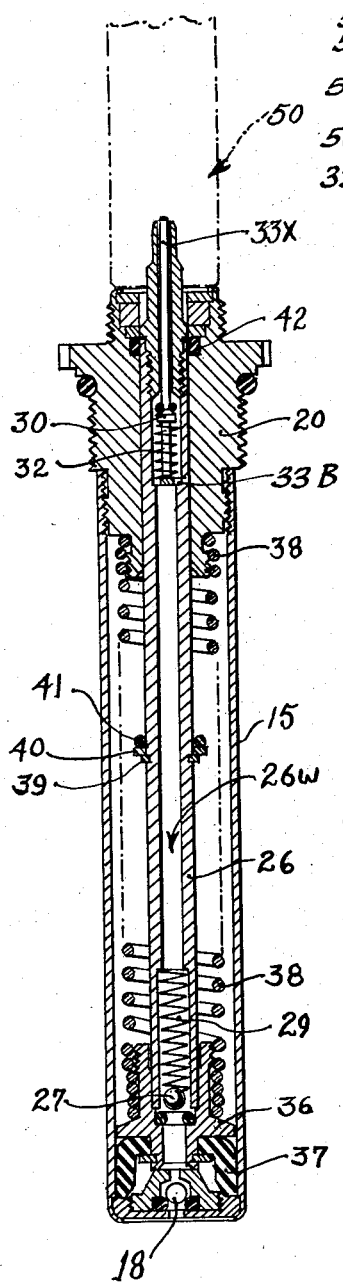
Fig. 5 is a cross-section through the measuring pump similar to that of Fig. 2.

The fueling pump, as depicted in Fig. 1, consists of a metal canister 10 having an internally threaded neck 11 which is threadedly seated in the pump unit 12, from the upper end of which projects a piston rod terminating in a charging nipple 13, which is adapted to enter the filling port in various currently popular gas lighters using liquid gas fuel.

As viewed in Fig. 2, the pump unit consists of an elongated tubular jacket or pump cylinder 15 closed at its lower end by a bottom wall having a fuel entrance guarded by a check valve structure including a frusto-conical member 16 traversed by a passage 17 communicating into an enlarged ball-chamber portion which freely houses a ball check 18 normally seating on a rubber O-ring 19 therebelow.

The upper end of the pump cylinder 15 is closed by a large metal plug 20 threaded into the mouth thereof and provided with external threading 21 to engage the neck of the canister 10, and having a further threading 22 to receive a closure cap 23. Beneath a knurled annular nut portion 24 is an O-ring 25 providing an upper body seal for the cylinder.

Slidable in a bore in the cylinder plug is a combination piston and injector rod 26 having a bore therethrough the lower end of which is normally closed by a measuring valve in the form of a ball-check 27 seating against an O-ring 28 and backed by a spring 29. The aforesaid bore defines a fuel well 26W.

Figure 3:
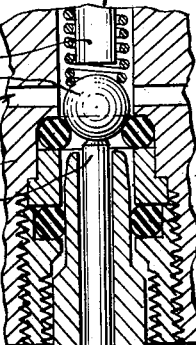
Fig. 3 is an enlarged cross-sectional operating detail of the injecting nipple on the charging canister and parts of the charging port and valve on a gas lighter illustrating the initial charging contact.
Figure 6:
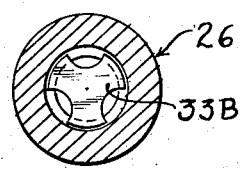
Fig. 6 is a cross-sectional detail of the poppet-stem stop as seen along lines 6—6 of Fig. 3.

The upper or nozzle end of the injector rod projects beyond the cylinder and carries an internal poppet-type discharge valve 30 grooved to carry an O-ring 31 and backed by a spring 32, there being a long valve stem 33 traversing the poppet to guide the spring on the inner side and projecting outwardly through the nipple piece 13, which is threaded into the mouth of the tubular injector rod, with an exposed tip portion 33X cooperable with the gas lighter in a manner to be described. Spring 32 is seated by a perforate backer 33B (Figs. 3 and 6).

The lower end of the injector rod is fitted with piston means including a flanged metal header 36 having a bore aligned with the lower ball check 27 and carrying a resilient skirted plunger 37.

Embracing the injector rod is a large traction spring 38 which is seized upon the plunger header and a neck on plug 20 whereby to retract the injector rod, and hence the plunger means 36—37, to a normally elevated position, as in Fig. 2.

A combination safety valve and stop means is provided intermediately of the upper and lower check valves, and includes a hairpin washer 39, fitted into a groove in the injector rod, a full washer 40 seated on the hairpin washer, and a tight O-ring 41 seated on that combination, such that in the condition of Fig. 2 the upward movement of the injector rod by spring 38 is stopped by impingement of the O-ring 41 firmly against the plug 20, with the result that the external regions about the injector rod between the plunger 37 and plug 20 are substantially sealed at the latter point, a further sealing being provided by another O-ring 42 embracing the outer regions of the rod at the head of the plug, the last-mentioned sealing ring being secured by a heavy washer means 43 peened into a suitable recess in the plug.

With the pump unit in the normal condition of Fig. 2 and installed in canister 10, as in Fig. 1, and the latter properly charged with a liquified fuel gas, such as propane or butane, at a pressure of some 80 p.s.i., the internal pressure will force a predetermined volume of the liquid fuel past the ball check 18 into the lower chamber of the pump cylinder 15 which is defined between the plunger 37 and the bottom of the cylinder jacket, and up into the bore of well 26W.

The liquid entering this lower primary chamber does not pass the plunger check valve 27 into the upper measuring chamber at this time; and when the lower chamber is full the lower ball check 18 closes by gravity (the canister being held normally in the upright position), since the pressures on both sides of this check valve then become equalized.

Figure 4:
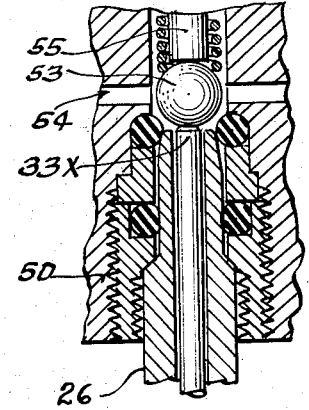
Fig. 4 is a cross-sectional operating detail similar to Fig. 3 but showing the parts in full charging position.

If a conventional "gas" lighter 50, such as shown in dotted lines in Fig. 1, is to be filled, the usual screw-plug closure 51 is first removed to expose the charging port and metering valve 52 thereof (see detail upper Fig. 2) and the lighter is lowered onto the nipple 13 of the injector rod to establish the initial charging contact which, by continued downward bearing upon the lighter, will force the injector rod 26 down along with the plunger 37 to displace the entrapped fuel in the lower chamber upwardly, forcing the ball check 27 to open and pass a fixed or maximum measure of liquid fuel into the measuring bore 26W in the rod, whereupon the ball check 27 will close and the transferred measure of fuel will then be trapped in the second charging stage, the aforesaid downward pressure on the lighter being continued the while, so that by the time the plunger check valve 27 has closed again and the plunger 37 has stopped against the conic seat formation 16, the manually applied force will be transferred without interruption to the exposed tip 33X of the metering valve stem, which will then engage the ball check 53 of the lighter (Fig. 3) forcing the latter to open and bear against a stop pin 55 (Fig. 4) and thereafter force the metering valve stem 33 downwardly to unseat the poppet 30, thereby permitting the fuel to expand rapidly from the measured volume in the injector rod bore into the lighter tank via the duct 54. The condition of the pump and injector parts at this time is illustrated in Fig. 5.

Upon withdrawal of the lighter from the nozzle the poppet 30 closes at once (as does the check valve in the lighter) and the injector rod is elevated by spring 38 to normal position with a consequent intake of another volume of fuel into the lower chamber of the cylinder below piston 37.

There may often be a substantial residual gas pressure in the lighter tank which in some degree opposes the entry of new fuel, and one of the important purposes of the measuring piston 37 and the manner in which it operates is to supplement the existing pressure in the measuring chamber to positively overcome any back pressure in the lighter to be sure that the latter receives an adequate and full charge of fuel.

Because of variations in tank size in different makes of lighter, and because of varying residual fuel and gas volumes in any particular lighter being fueled, the full volume of the measuring chamber 26W is not always expelled. So long as the pressure above any such residual fuel in bore 26W is greater than, or equal to, the pressure acting in the lower chamber the spring 29 will maintain the injector-rod ball check 27 closed; but any pressure differential favoring the lower chamber can cause the check valve 27 to open and admit more fuel to bore 26W provided the strength of spring 29 permits. In the manufacturing of the pump, spring 29 is supplied in both degrees of stiffness, namely: a hard spring to prevent any transfer of fuel into the upper measuring chamber unless sufficient manual force is applied to the piston means 37; and a soft spring, which permits valve 27 to open automatically under favorable pressure differential to refill the measuring bore without actuation of the pump. The stiffer spring makes it harder to push the lighter down in the fueling operation and will leave a minimum of residual fuel in the upper chamber 26W; the soft spring permits relatively easy fueling and can leave substantial amounts of fuel in the measuring chamber. Thus, the stiffer spring 29 affords a limited safety check since accidental opening of the nipple or poppet valve means 30—33X would release only the residual volume in chamber 26W; whereas such an occurrence with a soft spring 28 could release a substantially greater volume from both chambers, although the lower or entry check valve 18 tends to check or slow escape of the gas from the main body in the canister under such circumstances.

The described valve system and the poppet or nipple-tip control at 33X, permit an exceedingly rapid fueling—almost instantaneously; yet the rate of escape and gasification upon accidental or mischievous opening of the nipple valve permits dangerous saturation of the surrounding air.

Ordinarily the conventional pocket lighter is designed to be filled from a small bomb containing only a single refill charge and having a metal seal which is automatically pierced by screwing the neck of the bomb into the filler port on the lighter, the (sometimes) empty bomb being unscrewed and thrown away when it is considered that the full charge has been delivered into the lighter.

Unless this prior means and method of charging is carefully executed and the lighter tank is reasonably empty at the time, it is the too-common experience that a poor refill and waste of gas results.

The disclosed fueling pump provides a means for delivering a positive refill charge into the lighter regardless of existing back pressure therein.

Moreover, a supply of liquid fuel adequate for several years normal consumption per lighter can be provided in the described canister measuring about four inches in diameter by five inches in height, as against the size of the usual refill bomb which has a diameter of about ⅝ inch by a height of about 2½ inches, but contains only a single charge.

I claim:

1. A metering type injection pump for charging cigarette lighters with liquified fuel gases and comprising: a canister for the liquid fuel; a pump cylinder sealed into the canister; an injector rod having a through-bore reciprocable in said cylinder and including a nipple portion engageable with the charging part of a lighter and projecting beyond the canister; a fuel entrance at the bottom of said cylinder normally communicating into liquid fuel in the canister; piston-plunger means working in said cylinder and attached to the lower end of said rod and having a fuel passage entering the bore of the latter; a first check valve means guarding said entrance against reverse flow of the liquid fuel from the cylinder back through the entrance; a spring-urged measuring check valve guarding the entrance from said piston plunger into said rod bore against reverse liquid flow toward said entrance; a spring-closed metering valve normally closing passage of fuel from said bore through said nipple and having a stem portion projecting from the nipple for exposure to an operating contact with a lighter charging member; spring means normally elevating said piston plunger away from said cylinder entrance to initially admit a predetermined volume of liquid fuel from the canister into said cylinder, pressure applied to said projecting portion of the injector rod by pressing the lighter thereon displacing the rod and said plunger means to drive a portion of liquid fuel from the lower cylinder into said bore and into the lighter being charged to the volumetric extent of the gas pressure parameters acting at the time; mechanical pressure acting upon said exposed metering valve stem applied in the same direction as that displacing the injector rod, as aforesaid, unseating said metering poppet to permit forced egress of the fuel from said nipple.

2. An automatic measuring pump for liquified gaseous fuels of the class of butane and propane gas, said pump comprising: a sealed jacket; a fuel-containing canister in which said jacket seats; a pressure-operated check valve guarding an entrance into the bottom of said jacket; a spring-elevated plunger reciprocable in said jacket and including a discharge tip portion projecting from the top portion of said jacket as well as a bore to contain a measured volume of liquid fuel communicating into said tip; a needle-type check valve guarding a fuel exit through said tip portion and having a needle stem projecting therefrom for engagement with a spring seated check valve at the bottom of said plunger; a pump plunger for sealing off the piston in the downward stroke thereof; spring means normally returning the plunger to elevated condition; spring means normally returning the needle valve to a closed elevated condition; said plunger being depressed by action of pressing a chamber to be charged down upon said tip with force sufficient to depress and open said needle valve whereby the fuel contents of said inner bore escape into said chamber whilst another charge of fuel is injected into the bore by downward action of said plunger, said check valve in the plunger closing under back pressure and spring action to prevent escape from said chamber while the plunger is depressed.

3. In a metering fuel canister, a cylinder sealingly fitting into the canister; a fuel inlet at the bottom of the cylinder; an injection tube slidable in the cylinder with a portion exposed through the top thereof; a piston carried at the bottom of the tube; spring means normally raising the tube and piston in the cylinder; means providing an injection nozzle at the top of said exposed portion for entry into a gas lighter; a fuel inlet through said piston into the bore of said tube, said bore constituting a measuring chamber and the region between said piston in raised condition and the bottom of the cylinder constituting a pump chamber; valve means guarding each of said fuel inlets and said nozzle and normally closed against passage of fuel from the canister through said nozzle; and a rod-like valve operator exposed through said nozzle for engagement with interior portions of a lighter pressed down thereon to move said operator inwardly of the nozzle and open the valve means guarding the nozzle; said pressing of the lighter also being effective to depress said tube and piston and force fuel from the pump chamber into said measuring chamber past the valve means therebetween.

4. In a fueling canister for cigarette lighters wherein the canister is charged with liquified fuel under substantial pressure, improvements comprising: a plunger type pump in the canister said pump having a spring-returned plunger and a measuring tube opening to the fuel through the plunger; a spring-closed check valve normally closing said opening of the measuring tube and openable responsive to fuel displacing movement of the plunger; a nipple projecting from said tube and having a nozzle to enter the fueling port of a lighter of the type having an abutment in said port; a spring-closed check valve normally closing fuel passage from said tube to said nozzle, said valve including an actuating stem projecting outwardly of said nozzle a short distance sufficient to engage a lighter abutment as aforesaid when the lighter port is pressed manually down upon said nipple a predetermined amount sufficient to displace said plunger.

References Cited in the file of this patent

UNITED STATES PATENTS

| | | |
|---|---|---|
| 1,749,216 | Goldman | Mar. 4, 1930 |
| 1,875,902 | Wickwire | Sept. 6, 1932 |
| 2,168,493 | Plews | Aug. 8, 1939 |
| 2,212,379 | Smith | Aug. 20, 1940 |
| 2,664,727 | Gehrie | Jan. 5, 1954 |
| 2,684,805 | McBean | July 27, 1954 |
| 2,737,329 | Bolsey | Mar. 6, 1956 |
| 2,769,325 | Storch | Nov. 6, 1956 |

FOREIGN PATENTS

| | | |
|---|---|---|
| 3,419 | Great Britain | Aug. 25, 1879 |